(12) United States Patent
Rhodes et al.

(10) Patent No.: US 11,069,200 B1
(45) Date of Patent: Jul. 20, 2021

(54) SYSTEMS AND METHODS FOR REDUCING ATM DEPOSIT LOSSES

(71) Applicant: Wells Fargo Bank, N.A., San Francisco, CA (US)

(72) Inventors: Jerome Rhodes, Hayward, CA (US); Michael R. Thomas, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 246 days.

(21) Appl. No.: 16/421,319

(22) Filed: May 23, 2019

Related U.S. Application Data

(63) Continuation of application No. 15/466,748, filed on Mar. 22, 2017, now Pat. No. 10,304,295.

(60) Provisional application No. 62/319,271, filed on Apr. 6, 2016.

(51) Int. Cl.
| | |
|---|---|
| *G07F 19/00* | (2006.01) |
| *G06Q 20/10* | (2012.01) |
| *G06Q 20/40* | (2012.01) |

(52) U.S. Cl.
CPC ....... *G07F 19/202* (2013.01); *G06Q 20/1085* (2013.01); *G06Q 20/4016* (2013.01); *G07F 19/203* (2013.01)

(58) Field of Classification Search
CPC ..... G07F 19/202; G07F 19/203; G06Q 20/10; G06Q 20/1085; G06Q 20/4016
See application file for complete search history.

(56) References Cited

U.S. PATENT DOCUMENTS

| | | | |
|---|---|---|---|
| 8,300,915 | B2 | 10/2012 | Williamson et al. |
| 8,447,094 | B2 | 5/2013 | Calman |
| 8,510,221 | B2 | 8/2013 | Votaw et al. |
| 8,712,143 | B2 | 4/2014 | Tran |
| 9,195,889 | B2 | 11/2015 | Klein et al. |
| 2005/0035193 | A1 | 2/2005 | Gustin et al. |
| 2006/0106717 | A1 | 5/2006 | Randle et al. |
| 2015/0030307 | A1 | 1/2015 | Williams, Jr. |

(Continued)

OTHER PUBLICATIONS

Jackel, et al., Optical Character Recognition for Self-Service Banking, AT&T Technical Journal, vol. 74, No. 4, Jul./Aug. 1995, 9 pages.

*Primary Examiner* — Laura A Gudorf
(74) *Attorney, Agent, or Firm* — Foley & Lardner LLP

(57) ABSTRACT

A system for processing a deposit can include a financial institution computing system for use in processing a deposit from a customer at an automated teller machine (ATM). The system can include input/output logic configured to receive, from the ATM, deposit information and an event indicator value corresponding to an interaction between the customer and the ATM; confidence score generating logic configured to analyze the deposit information received from the ATM and to determine a confidence score related to an amount of the deposit based on the analysis; and a risk-decisioning system including funds availability logic configured to calculate an availability value based on the event indicator and the confidence score. The risk-decisioning system can be configured determine that the availability value is greater than an availability threshold, and to responsively make an amount of funds available to the customer for withdrawal at the ATM.

20 Claims, 6 Drawing Sheets

(56) References Cited

U.S. PATENT DOCUMENTS

2015/0117748 A1     4/2015   Smith et al.
2015/0127533 A1     5/2015   Knebel et al.
2016/0358141 A1*   12/2016   Pigg .................. G06Q 20/4016

* cited by examiner

SYSTEMS AND METHODS FOR REDUCING ATM DEPOSIT LOSSES

CROSS-REFERENCE TO RELATED APPLICATIONS

This application is a continuation of U.S. patent application Ser. No. 15/466,748 entitled "SYSTEMS AND METHODS FOR REDUCING ATM DEPOSIT LOSSES" filed Mar. 22, 2017, which claims priority to U.S. Provisional Patent Application No. 62/319,271 entitled "SYSTEMS AND METHODS FOR REDUCING ATM DEPOSIT LOSSES", filed Apr. 6, 2016 and incorporated herein by reference in their entireties.

TECHNICAL FIELD

Embodiments of the present disclosure relate to reducing automated teller machine (ATM) deposit losses.

BACKGROUND

Account holders (e.g., individuals who have an account with a financial institution) often utilize automated teller machines (ATMs) to deposit checks or money orders into their account. The checks or money orders contain payment information (e.g., account numbers, payment amounts, routing numbers, etc.) related to a transaction between the account holder and another entity (e.g., individual, corporation, government, etc.). ATMs analyze deposited checks and money orders to obtain the payment information. Occasionally, a check deposit or money order is altered such that the payment information obtained by ATMs differs from the payment information on the original check deposit or money order. Accordingly, funds that are available based on the altered payment information may differ from funds that should be available based on the original payment information. These instances may result in the account holder, or a person posing as the account holder, withdrawing funds that should not be available to them based on the check deposit or money order.

SUMMARY

An example embodiment relates to a system. The system can include a financial institution computing system for use in processing a deposit from a customer at an ATM. The system can include input/output logic configured to receive, from the ATM, deposit information and an event indicator value corresponding to an interaction between the customer and the ATM; confidence score generating logic configured to analyze the deposit information received from the ATM and to determine a confidence score related to an amount of the deposit based on the analysis; and a risk-decisioning system including funds availability logic configured to calculate an availability value based on the event indicator and the confidence score. The risk-decisioning system can be configured determine that the availability value is greater than an availability threshold, and to responsively make an amount of funds available to the customer for withdrawal at the ATM.

Another example embodiment relates to a system. The system can include an ATM including event indicator logic configured to determine an event indicator value indicating whether a customer was prompted to enter a keyed-in deposit amount, or indicating that the customer did not enter a keyed-in deposit amount; and deposit logic configured to determine deposit information related to a transaction. The ATM can further include input/output logic configured to transmit, to a financial institution computing system, the event indicator value and the deposit information, and to receive, from the financial institution computing system, an indication that an amount of funds is available for withdrawal, the amount determined by the financial institution computing system based on the event indicator value. The ATM can further include a receptacle configured to dispense funds.

Another example embodiment relates to a method. The method can be a method for processing a deposit of a customer of an automated teller machine (ATM) using a financial institution computing system. The method can include receiving deposit information from the ATM; analyzing the deposit information to determine a confidence score; receiving, from the ATM, an event indicator having an event indicator value corresponding to an interaction between the customer and the ATM; calculating an availability value based on the event indicator and the ATM information; and making an amount of funds available to the customer for immediate withdrawal at the ATM responsive to the availability value being greater than an availability threshold.

These and other features, together with the organization and manner of operation thereof, may become apparent from the following detailed description when taken in conjunction with the accompanying drawings.

DETAILED DESCRIPTION

Figure 1:
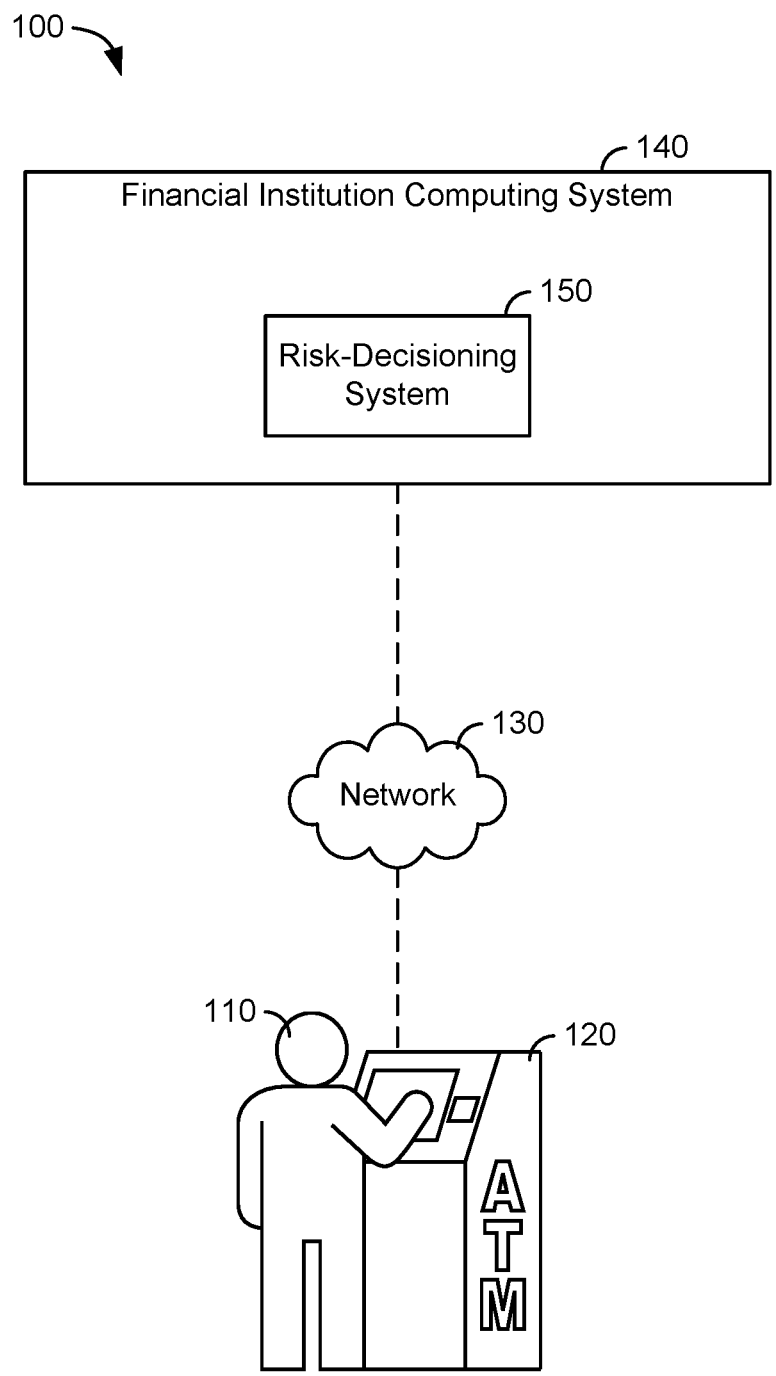
FIG. 1 is a diagram of a depositing system, according to an example embodiment.

Referring to the Figures generally, systems, methods, and apparatuses for reducing ATM deposit losses are provided herein.

According to one embodiment, a depositing system includes an automated teller machine (ATM) and a financial institution computing system that is communicable via a network with the ATM. The ATM receives deposits (e.g., checks, money orders) from a customer. The financial institution computing system includes a risk-decisioning system. The ATM analyzes a deposit to obtain deposit information including values extracted from an image of the deposit and confidence scores for those values. Event indicators are also stored that indicate if, and if so how and when, the customer entered a keyed-in deposit amount for the deposit. The financial institution computing system may process the deposit information and provide the deposit information to the risk-decisioning system. The risk decisioning system may make a determination, based on the processed deposit information, whether or not to make funds from the deposit available to the customer for immediate withdrawal.

According to the present disclosure, an ATM is provided that is configured to receive deposits (e.g., checks, money orders) from a customer. In operation, the customer may insert the deposit into the ATM (e.g., via a currency/check deposit slot). The ATM analyzes the deposit and obtains information about the deposit (e.g., deposit account number, deposit amount, date/time of transaction, ATM identification, magnetic ink character recognition information, routing number, etc.). This deposit information is then transmitted to a financial institution computing system which includes a risk-decisioning system which analyzes the deposit information to make one or more determinations. For example, the risk-decisioning system may determine if the deposited funds should be made available to the customer for immediate withdrawal or if the deposit requires further verification. In some embodiments, the risk-decisioning system may obtain a courtesy amount recognition (CAR) deposit amount and/or legal amount recognition (LAR) deposit amount. The CAR value is the numeric value on the check (e.g., $300.00) while the LAR value is the alphanumeric value on the check (e.g., "Three-hundred dollars and zero cents"). The risk-decisioning system may then compare the CAR deposit amount to the LAR deposit amount. In some embodiments, the risk-decisioning system may generate confidence scores associated with the CAR deposit amount and/or the LAR deposit amount. The risk-decisioning system may also then compare the CAR confidence score and the LAR confidence score.

In many applications, the deposit information includes an event indicator. The event indicator may have different values corresponding to different events. For example, if the customer enters a keyed-in deposit amount voluntarily, the event indicator may have a first value. However, if the ATM prompts the customer to enter a keyed-in deposit amount, and the customer does so, the event indicator may have a second value. Further, if, throughout the entire depositing process, the customer does not enter a keyed-in deposit amount, the event indicator may have a third value. The value of the event indicator is contained within the deposit information or is transmitted by the ATM along with the deposit information. The risk-decisioning system may use the event indicator, in part, to determine if funds should be made available to the customer for immediate withdrawal. The deposit information may include one or more confidence scores. In the present context, a confidence score is a score (or other value or indicator) representing the probability that information scanned from a deposit (e.g., a check, a money order, etc.) has been correctly interpreted, e.g., by optical character recognition (OCR) logic. For example, one or more confidence scores may be generated for each of the MICR (magnetic ink character recognition) and the CAR (courtesy amount recognition). In some embodiments, the LAR (legal amount recognition) is also read and a confidence score is generated for that value as well. By analyzing the deposit information, including the confidence scores and the event indicator, the risk-decisioning system can prevent deposits which may have been altered (e.g., to increase the deposit amount) from being able to be immediately withdrawn. For if one or more of these confidence scores are low (depending on the control logic utilized), the risk decisioning system may determine that further evaluation of the deposit is needed prior to making the funds available for immediate withdrawal. Comparatively, if one or more of these confidence scores are high (depending on the control logic utilized), the risk decisioning system may determine that the funds are available for immediate withdrawal. Accordingly, the depositing system may prevent at least some losses that can occur because of the depositing of altered deposits.

Further the apparatuses, methods and systems of the present disclosure utilize character recognition and confidence scoring of the recognized data to provide for more timely and accurate control of a currency dispenser of an ATM. Control of the currency dispenser is made more timely in that currency may be in some instances dispensed immediately, rather than after a period of delay while the deposit is in a "pending" status. Thus, transaction processing occurs more quickly. Control of the currency dispenser is made more accurate in that the currency dispenser is controlled so as to avoid dispensing currency when the character recognition is deemed to be of insufficient likelihood to be accurate.

Referring now to FIG. 1, a depositing system 100 is shown according to an exemplary embodiment. As described herein, the depositing system 100 may facilitate the depositing of an individual deposit (e.g., check deposit, money order) by a customer (e.g., account holder, client, etc.) 110. According to various embodiments, the depositing system 100 includes an automated teller machine (ATM) 120, a network 130, and a financial institution computing system 140. The financial institution computing system 140 may include a risk-decisioning system 150 that is integrated within, or otherwise communicable with, the financial institution computing system 140. In an exemplary operation, the customer 110 makes a deposit into the ATM 120 which then transmits the deposit through the network 130 to the financial institution computing system 140. In many operations, this step is preceded by the customer using the ATM 120. The network 130 may be any type of network. For example, the network 130 may be a wireless network interface (e.g., 802.11X, cellular network, satellite network, ZigBee, Bluetooth, Internet, etc.), a wired network interface (e.g., Ethernet, Fiber Optic, etc.), or any combination thereof. The network 130 is structured to permit the exchange of data, values, instructions, messages, and the like between and among the ATM 120 and the financial institution computing system 140. The network 130 may include, or otherwise connect the ATM 120 to, the Automated Clearinghouse network.

In one embodiment, the ATM 120 is a conventional ATM capable of both receiving deposits and depositing funds. For example, the ATM 120 may be used without depositing a check to perform functions such as withdrawals or deposits of paper currency and to check an account balance. Similarly, the ATM 120 may include a keypad, or similar user input device, containing a number of buttons (e.g., alpha numeric, etc.) configured to receive input from the customer 110. Additionally or alternatively, the ATM 120 may incorporate similar user input devices such as touch screens, gesture recognition, and so on. The customer 110 uses the user input devices, such as the keypad, to navigate a guided user interface (GUI) of the ATM 120. The GUI allows the customer 110 to perform the various functions of the ATM 120 and also displays information (e.g., prompts, images, text, etc.) to the customer 110. For example, the GUI of the ATM 120 may display account information (e.g., account balance, account number, etc.) to the customer 110.

The customer 110 may utilize the keypad of the ATM 120 to provide a personal identification number (PIN) to the ATM 120. The ATM 120 often transmits the PIN to the financial institution computing system 140 or to another external system or device such that the identity of the customer 110 is verified. Once verified, the ATM 120 grants access to customer 110 to make a deposit (e.g., deposit an order), withdraw funds, check a balance, or perform other account-specific operations. Instead of a PIN, other security measures (e.g., biometric, genetic, etc.) may be used to verify the identity of the customer 110.

In one operation, the depositing system 100 allows the customer 110 to make a deposit at the ATM 120. The customer 110 may insert the deposit into the ATM 120 directly or may navigate, using the GUI of the ATM 120, to a depositing command on the ATM 120. Typically, the ATM 120 has a receptacle (e.g., slot, etc.) 160 for receiving envelope-free deposits. The ATM 120 may selectively control the receptacle 160 to receive deposits from the customer 110. Once inserted into the receptacle 160, deposits are analyzed by the ATM 120 to obtain deposit information. The deposit information obtained from deposits includes both extracted information and generated information. The extracted information is information extracted directly from the deposit. For example, this information may include one or more of information extracted via optical character recognition (in the case of CAR and/or LAR), information extracted via magnetic reading (in the case of the MICR), and so on. For example, in the case of a personal check, the extracted information may include a deposit amount (represented in CAR and/or LAR) and a bank routing number and payor account number (represented in MICR). The generated information is generated by the ATM and included with the extracted information for the deposit. The generated information may include the one or more confidence scores and other information captured by the ATM during the transaction. According to various embodiments herein, deposit information is determined on a per-deposit basis (e.g., one set of deposit information for each check deposited, etc.) and not on a per-transaction basis (e.g., multiple deposited checks). However, in an alternative embodiment, multiple deposited checks are grouped together and their deposit information is combined producing a deposit information packages. Accordingly, it is understood that the description herein of deposit information could, in some alternative in embodiments, similarly include deposit information packages.

According to an exemplary embodiment, the deposit information includes a deposit account, a deposit amount, and magnetic ink character recognition (MICR) information, a date and/or time of the transaction, ATM identification, a CAR deposit amount, and a LAR deposit amount. The deposit information may also include bank account numbers, date on the deposit, and a scanned image of the deposit (e.g., a scanned image of the front and back sides of a deposited check). The ATM 120 may contain a check reader (e.g., comprising sensors, cameras, readers, detectors, and other equipment) configured to scan or otherwise capture check images and analyze deposits to obtain the deposit information. The check reader may also include a magnetic recognition circuit configured to read the MICR on check deposits. The ATM 120 may also include program logic configured to perform character recognition on the deposits (e.g., optical character recognition on the CAR and LAR in the check images, and magnetic character recognition on the MICR). As described herein, the risk-decision system 150 may determine one or more confidence scores to assess the quality or integrity of the deposit to, eventually, determine whether deposited funds should be available immediately to the payee (e.g., customer). Still further, the ATM 120 may incorporate other systems of fund and/or deposit analysis.

The ATM 120 transmits the deposit information to the financial institution computing system 140 through the network 130.

In some situations, the ATM 120 may present the customer 110 with the option to enter the deposit amount or other information related to a deposit. For example, in one scenario, after the ATM 120 analyzes the deposit, an original scanned-in deposit amount of the deposit is displayed to the customer 110. The customer 110 may select an input to the ATM indicating that the displayed amount is incorrect, and may utilize the GUI of the ATM 120 to correct the error. If the customer 110 enters information into the ATM 120 regarding the deposit, pursuant to the displayed amount being purportedly incorrect, the ATM 120 records an event indicator having a first value (e.g., "C—Customer initiated") as well as the keyed-in deposit amount which is transmitted in the deposit information along with the originally scanned-in deposit amount.

In some circumstances, the ATM 120 may require the customer 110 to input information regarding a deposit into the ATM 120. For example, many deposits contain handwritten information such as the deposit amount and date. Depending on handwriting and/or deposit characteristics (e.g., color, texture, background, etc.), the hand-written information may be difficult for the ATM 120 to discern. In these instances, the ATM 120 prompts the customer 110 and requires the customer 110 to input the corresponding information (e.g., deposit amount) into the ATM. If, however, the deposit is not capable of being read accurately the ATM 120, the ATM transmits the keyed-in deposit amount and a null-value for the scanned-in deposit amount to the financial institution computing system 140.

Whether the customer is prompted to input information about a deposit amount may be determined based on a confidence score(s) associated with the CAR and/or LAR values. In various embodiments, the ATM 120 transmits information regarding a deposit, including an event indicator, to the financial institution computing system 140. The financial institution computing system 140 analyzes the deposit information to determine confidence scores. Lower confidence corresponds to the information having a higher probability of being incorrect, whereas higher confidence corresponds to the information having a lower probability of being incorrect. The ATM 120 may simultaneously transmit deposit information while the customer 110 is still conducting the deposit. In various embodiments, the ATM 120 obtains a scanned image of the deposit which is sent to the financial institution computing system 140. If the confidence score(s) is too low, the financial institution computing system 140 may instruct the ATM 120 to prompt the customer 110 for the deposit information (e.g., deposit amount, etc.). The target confidence is set by the financial institution computing system 140 that may be reflective of a desired confidence in the deposit information obtained from the scanned-in image of the deposit before allowing immediate dispersal of the deposited funds. The target confidence may be a single threshold value applied to one confidence score (e.g., for CAR), or may take into account multiple confidence scores in the aggregate.

The ATM 120 may thus prompt the customer 110 based on a confidence score in the scanned-in deposit amount of the deposit that is below the target confidence. In such a case, if the customer 110 inputs information into the ATM 120 after being prompted to do so by the ATM 120, the ATM 120 records an event indicator having a second value (e.g., "A—ATM-prompted").

If the customer 110 chooses not to enter information (e.g., keyed-in deposit amount) into the ATM 120, and the ATM 120 has not prompted the customer 110 to enter information, the ATM 120 records an event indicator having a third value (e.g., "N—No keyed-in deposit amount") and merely transmits the originally scanned in amount.

Accordingly, in all cases the ATM 120 records an event indicator regarding the depositing of a deposit in ATM 120 which is included in the deposit information and transmitted to the financial institution computing system 140. However, the event indicator may also be transmitted simultaneously with, but separately from, the deposit information. In various embodiments, the event indicator is a one-byte field such as a single letter (e.g., "A," C," "N") or a single number (e.g., "1," "2," "3").

Low confidence scores may arise from a variety of issues. For example, for a handwritten check where the hand writing is unclear, the deposit information may contain lower confidence scores than for a hand written check where the hand writing is clear. This issue may manifest itself in a CAR confidence score or a LAR confidence score. It should be understood that other embodiments may utilize additional confidence scores that are indicative of other characteristics on the deposit (e.g., in addition to or in place of one of the other confidence scores discussed herein). Thus, the present disclosure is not meant to be limiting to either the numerical or MICR confidence scores.

After obtaining deposit information and confidence scores for a deposit, the risk-decisioning system 150 performs an analysis to determine whether or not to make funds from the deposit immediately available to the customer 110. In one example, if the confidence scores are above the target confidence, the risk-decisioning system 150 may decide to make the funds deposited available for immediate withdrawal by the customer 110 (e.g., where the CAR confidence score is high, and the customer has not changed the deposit amount). The target confidence may be determined by the risk-decisioning system 150 and may be determined on a per-customer, per-deposit, or per-ATM basis.

The risk-decisioning system 150 may determine an availability value using a combination of the confidence scores, the event indicator, and other deposit information. In this fashion, the customer 110 can obtain funds much quicker than with standard deposits which may take a couple of days to clear and to be available in an account for withdrawal. In this case, the financial institution computing system 140 transmits, through the network 130, information to the ATM 120 to indicate that funds are available for immediate withdrawal by the customer 110. As referred to herein, "immediate withdrawal" may indicate that funds can be dispensed by the ATM 120 shortly after (e.g., within a few seconds or minutes, within the same authenticated ATM session, etc.) the deposit being received by the receptacle 160. The ATM 120 may display a prompt or a message to the customer 110 on the GUI including, for example, whether the funds are available for immediate withdrawal. The customer 110 may then decide whether or not to immediately withdraw funds. The ATM 120 may then selectively control the receptacle 160 to dispense funds to the customer 110.

In some situations, a determination may be made to not make the funds immediately available for withdrawal. Accordingly, the financial institution computing system 140 transmits, through the network 130, information to the ATM 120 to indicate that funds are not available for immediate withdrawal by the customer 110. In this case, the ATM 120 may display a prompt or a message to the customer 110 on the GUI of the ATM 120 including, for example, an indication that the funds were deposited to the account of the customer 110 and that no funds are available for immediate withdrawal. After prompting the customer 110 regarding the availability of funds for immediate withdrawal, the ATM 120 may display other information to the customer 110 such as a remaining account balance.

Figure 2:
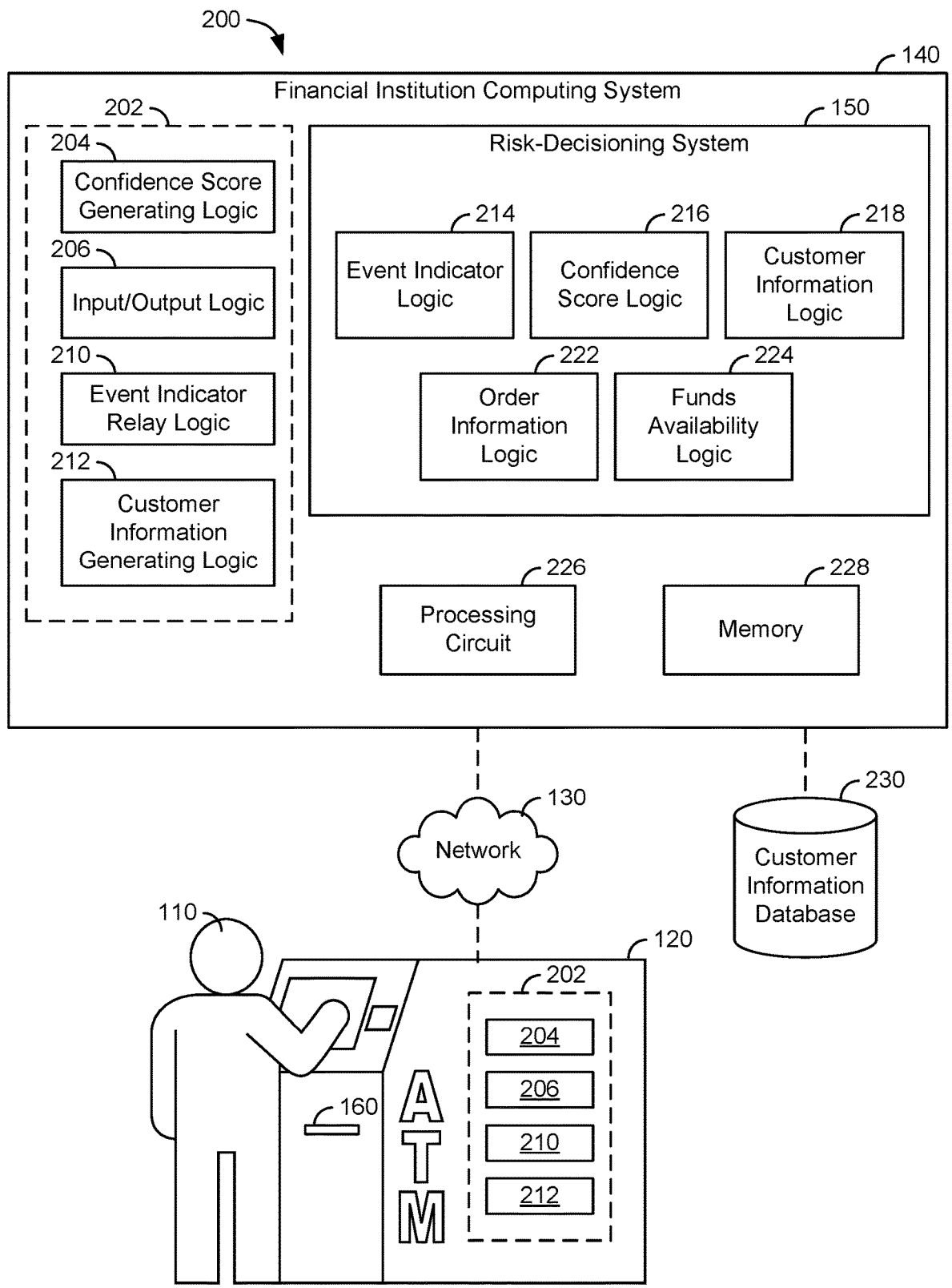
FIG. 2 is a detailed diagram of the depositing system of FIG. 1, according to an example embodiment.

With the above in mind, an example structure of the depositing system 100 including the financial institution computing system 140 and the risk-decisioning system 150 is shown in FIG. 2. As shown in FIG. 2, the financial institution computing system 140 and/or the ATM 120 may include a deposit processor 202. That is to say, in one embodiment, the financial institution computing system 140 includes the deposit processor 202. In another embodiment, ATM 120 includes the deposit processor 202. In alternate embodiments, one or more components of the deposit processor 202 are disposed in each of the ATM 120 and the financial institution computing system 140. In this regard and while the deposit processor 202 is primarily described herein as being implemented in the financial institution computing system 140, this description is exemplary only and not meant to be limiting. As shown, the deposit processor 202 includes confidence score generating logic 204, input/output (I/O) logic 206, event indicator relay logic 210, and customer information generating logic 212. In various embodiments, the risk-decisioning system 150 includes event indicator logic 214, confidence score logic 216, customer information logic 218, deposit information logic 222, and funds availability logic 224. It is understood that all of the components of the financial institution computing system 140 may be communicable with all of the components of the risk-decisioning system 150.

As described in FIG. 1, the financial institution computing system 140 is communicable with the ATM 120 through the network 130. In some embodiments, the financial institution computing system 140 is additionally communicable with a customer information database 230. It is understood that the financial institution computing system 140, the risk-decisioning system 150, and the deposit processor 202 may include additional components, logic, or systems to account for any of the capabilities discussed herein. As further shown in FIG. 2, the financial institution computing system 140 includes a processing circuit 226 and a memory 228. While not shown, it is understood that the ATM 120 may additionally or alternatively include a processing circuit and/or a memory.

As shown, the financial institution computing system 140 includes the processing circuit 226 and the memory 228. The memory 228 may include database components, object code components, script components, or any other type of information structure for supporting the various activities and information structures described herein.

The I/O logic 206 facilitates transfer of information between the ATM 120 and the financial institution computing system 140. In one embodiment, the I/O logic 206 receives information, such as deposit information, from the ATM 120 through network 130. Similarly, the I/O logic 206 may communicate with the customer information database 230. For example, the I/O logic 206 may facilitate transfer of account information corresponding to a customer (e.g., the customer 110) from the customer information database 230 to the ATM 120 or the financial institution computing system 140. Communications between the I/O logic 206 and the customer information database 230 may occur over a network similar or identical to the network 130. The I/O logic 206 may connect to various receivers, transmitters, antennas, satellites, cables, and other necessary hardware to facilitate transmission of information to and from the financial institution computing system 140.

In one embodiment, once received by the I/O logic 206, deposit information from the ATM 120 is directed to different components of the financial institution computing system 140 and the risk-decisioning system 150. For example, the confidence score generating logic 204 analyzes the scanned image of the deposit to determine a number of confidence scores, such as one or more scores relating to the readings of MICR, CAR and/or LAR, as previously described. The confidence scores generated by the confidence score generating logic 204 are transmitted to the risk-decisioning system 150 for further analysis.

In another embodiment, the confidence score generating logic 204 may generate, for instance, CAR and LAR confidence scores. In application, the CAR confidence scores measure the confidence in the numerical deposit amount extracted from the check (e.g., $300.00) while the LAR confidence score measures the confidence in the alphanumeric deposit amount extracted from the check (e.g., "three-hundred dollars and zero cents").

The deposit processor 202 may include the event indicator relay logic 210. The event indicator relay logic 210 may be configured to separate the event indicator from the deposit information received by the I/O logic 206. In some embodiments, the event indicator relay logic 210 performs subsequent processing on the event indicator prior to being received by the risk-decisioning system 150. The event indicator relay logic 210 may store event indicators at a separate location for future processing and data analysis. For example, the event indicator relay logic 210 may be communicable with an external storage server. In these applications, the event indicator relay logic 210 transmits the event indicators and other desired information via the I/O logic 206.

The event indicator relay logic 210 may process the event indicator differently depending on the deposit information. For example, the event indicator relay logic 210 may cause the I/O logic 206 to transmit the ATM identification along with the event indicator to a separate location (e.g., server) for processing, or the processing may be performed in the event indicator relay logic 210. This processing may illustrate event indicator trends for a particular ATM (e.g. the ATM 120). For example, if a particular ATM consistently returns a high number of event indicators having the second value (e.g., "A—ATM-prompted"), the separate location indicates that the particular ATM may need to be serviced. If such an event indicator trend is detected, the event indicator transmitted to the risk-decisioning system 150 may be flagged.

Similarly, the event indicator relay logic 210 may instruct the risk-decisioning system 150 to process the deposit information differently depending on the event indicator. For example, in one embodiment, if the event indicator relay logic 210 transmits an event indicator indicating that a customer keyed-in a deposit amount, an alert may be generated. As another example, an alert may be generated if the CAR value and the LAR value do not match, even if the customer did not key in a deposit amount. In general, any situation that is described herein as resulting in deposited funds not being available for immediate withdrawal may also trigger such an alert. The alert may be transmitted along with the deposit information to the risk-decisioning system 150 and/or to a bank associated with the customer where the deposit information is processed. The risk-decisioning system 150 and/or the bank associated with the customer may process the deposit information differently if the deposit information contains an alert. For example, if the deposit information contains an alert, the bank associated with the customer may perform additional analysis on the deposit (e.g., a manual analysis of the check image may be performed in instances of suspected fraud).

According to an exemplary embodiment, the customer information generating logic 212 is configured to obtain information related to the customer (e.g., the customer 110) corresponding to the deposit information received by the financial institution computing system 140. In some embodiments, the I/O logic 206 is communicable with the customer information database 230. The customer information database 230 may contain information such as account numbers, balances, transaction histories, and other information relating to the financial institution to which the customer who is making the deposit is an account holder.

In one application, for a deposit that is issued by the same financial institution as the customer making the deposit (i.e., an intrabank transfer, etc.), the customer information generating logic 212 may request information on the payor from the customer information database 230. For example, the customer information generating logic 212 may verify that the payor has the necessary funds available to cover the deposit, may place a hold on the necessary funds in the account of the payor until the deposit has cleared, or may immediately process the deposit, and subsequent withdrawal of the funds from the account of the payor. Further, the customer information database 230 may be representative of multiple banks, between which communication in substantially real-time may occur. For example, different banks may exchange balance information of the payor which may then be transmitted to the financial institution computing system 140.

Similar to the event indicator relay logic 210, the customer information generating logic 212 may transmit deposit information, including the event indicator, to the customer information database 230 through the I/O logic 206. For example, the customer information generating logic 212 may update the account of the customer making the deposit when a deposit is successfully deposited or funds are withdrawn. Similarly, the customer information generating logic 212 may record event indicators for deposits that are associated with a particular customer.

The risk-decisioning system 150 performs analysis of the information received by the financial institution computing system relating to the deposit to determine if funds from the deposit should be made available for immediate withdrawal by the customer depositing the deposit. In an exemplary embodiment, each of the event indicator logic 214, the confidence score logic 216, the customer information logic 218, and the deposit information logic 222 produces a score (e.g., value, indicator, representation, etc.) for the deposit independent of the others. These scores are analyzed by the funds availability logic 224 such that a final determination is made in light of each of the scores. In some embodiments, the scores are individually assigned weighting factors by the funds availability logic 224 which uses them to perform a weighted calculation. Depending on, for example, the deposit information or the customer information, the weighting factors and/or the weighted calculation may change. The funds availability logic 224 may perform this weighted calculation to produce the availability value for the deposit which is then compared to the availability threshold to determine if the funds should be made available to the customer for immediate withdrawal.

The event indicator logic 214 in the risk-decisioning system 150 receives event indicators from either I/O logic 206 or event indicator relay logic 210. As previously indicated, event indicators are also stored that indicate if, and if so how and when, the customer entered a keyed-in deposit amount for the deposit. In some operations, the event indicator logic 214 calculates an event indicator value which is output to the funds availability logic 224.

The confidence score logic 216 in the risk-decisioning system 150 receives the number of confidence scores from the confidence score generating logic 204. According to various embodiments, the confidence score logic 216 receives both a first confidence score and a second confidence score that is different (e.g., distinct) from the first confidence score, from the confidence score generating logic 204. In one embodiment, the confidence score logic 216 receives a CAR confidence score and LAR confidence score from the confidence score generating logic 204. In some embodiments, the confidence score logic 216 performs a comparison between the number of confidence scores to output a confidence score comparison to the funds availability logic 224. However, the number of confidence scores can be output directly to the funds availability logic 224 without being adjusted, altered, or compared in any way.

The customer information logic 218 in the risk-decisioning system 150 receives customer information from the customer information generating logic 212. The customer information logic 218 may analyze all or mostly all of the obtained customer information to make a determination as to if, and if so how strongly, the customer's information should impact the customer's ability to immediately withdraw funds. For example, some customer accounts may be associated with previous incidence of fraud. Accordingly, after this analysis the customer information logic 218 outputs a customer information value to the funds availability logic 224.

The deposit information logic 222 in the risk-decisioning system 150 receives deposit information from the ATM 120 through the network 130. The deposit information may include information about the deposit such as the deposit amount, bank account numbers, date and time of the transaction, date on the deposit, ATM identification, and a scanned image of the deposit (e.g., the original deposit). The deposit information logic 222 analyzes the deposit information to output a deposit information value to the funds availability logic 224.

The funds availability logic 224 combines inputs from the event indicator logic 214, the confidence score logic 216, the customer information logic 218, and the deposit information logic 222. In various exemplary embodiments, the risk-decisioning system analyzes, based on the event indicator value, the input from the confidence score logic 216, the customer information value, and the deposit information value, to determine if the funds from the deposit should be made available to the customer for immediate withdrawal at the ATM 120. For example, in some embodiments, these parameters are weighted and combined to determine an overall availability value of the deposit which may then be compared to an availability threshold to determine whether the funds may be made immediately available. In other embodiments, the funds availability logic 224 may simply make this determination based on one or more flagged values (e.g., if the customer information value is flagged, etc.). Once the determination has been made, the I/O logic 206 transmits any necessary instructions and/or prompts to the ATM 120. Deposited funds that are not withdrawn are credited (or remain credited) to the account of the customer.

While several processes have been described herein as occurring in the funds availability logic 224, it is understood that these processes could similarly be implemented at other locations within the financial institution computing system 140 and the risk-decisioning system 150. In some embodiments, each of the confidence score generating logic 204, I/O logic 206, event indicator relay logic 210, customer information generating logic 212, event indicator logic 214, confidence score logic 216, customer information logic 218, deposit information logic 222, and funds availability logic 224 individually or collectively include various physical computing components such as a processor and a memory.

While portions of the above description describe the deposit processor 202 in relation to the financial institution computing system 140, it is understood that the same description can similarly apply to the deposit processor 202 in the ATM 120. Further, in one embodiment, both the financial institution computing system 140 and the ATM 120 each include the deposit processor 202.

In one embodiment, the risk-decisioning system 150 is included in the ATM 120 and not included in the financial institution computing system 140. However, in another embodiment, the risk-decisioning system 150 is included in the ATM 120 and the financial institution computing system 140. Further still, it is understood that the financial institution computing system 140 may be included in the ATM 120.

Figure 3:
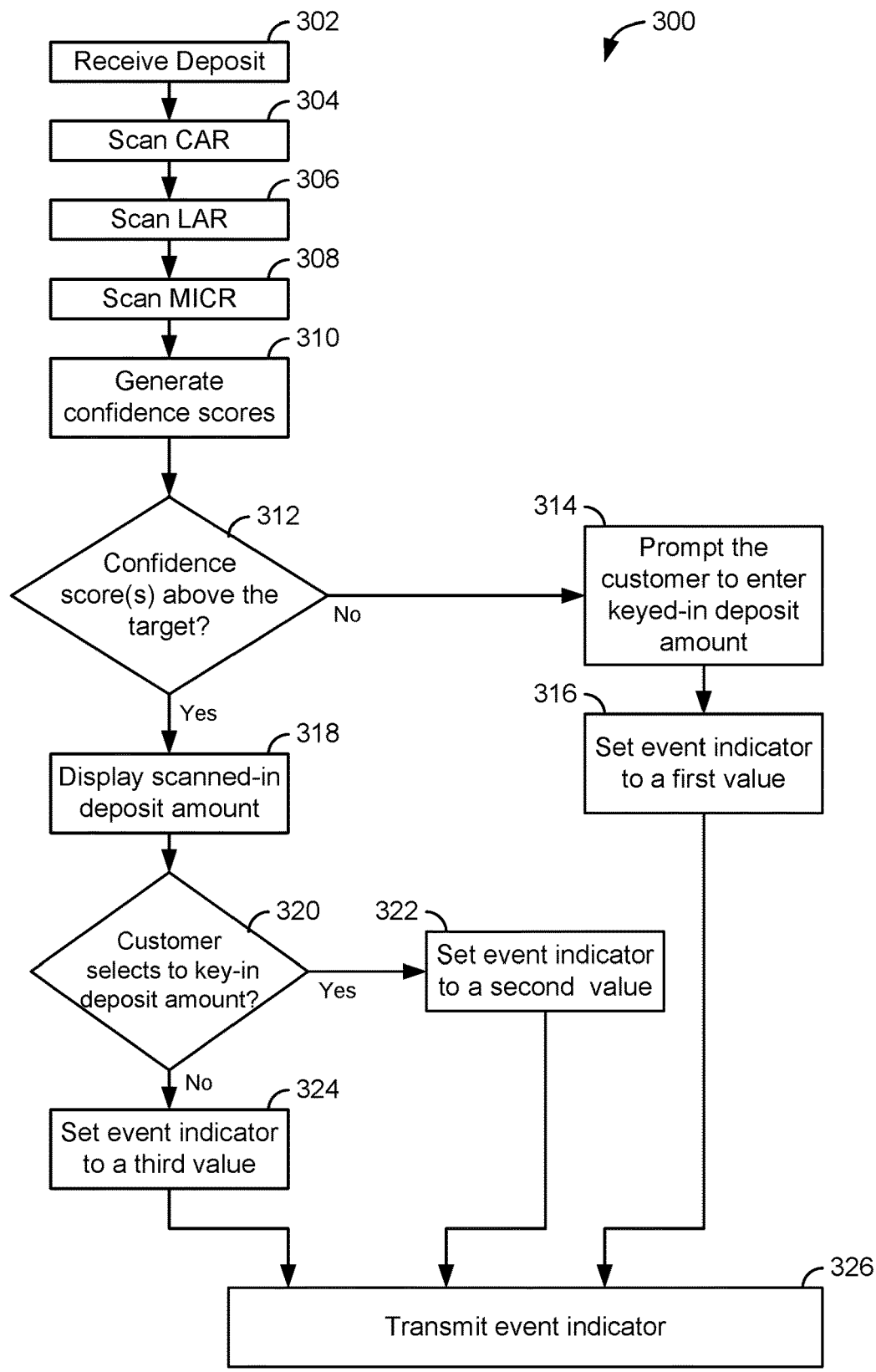
FIG. 3 is a flow diagram of a method of determining an event indicator value for implementation in the depositing system of FIG. 1, according to an example embodiment.

Referring now to FIG. 3, a method for determining an event indicator 300, such as that utilized in the depositing system 100. As previously indicated, the event indicator may take on different values, depending on whether and how the customer keys-in amount information for the deposit. At 302, a deposit (e.g., check, money order, etc.) is received from the customer at the ATM 120. For purposes of an example, it will be assumed that the deposit is in the form of a check. At 304-308, the CAR, LAR and MICR are scanned, respectively. As will be appreciated, the CAR and LAR may be scanned when the check is imaged by a check reader inside the ATM. The check image may then be analyzed with optical character recognition logic to arrive at a numeric value for the CAR and an alphanumeric value for the LAR. Likewise, the MICR may be scanned using a magnetic sensor. At 310, one or more confidence scores is generated for the values assigned to the CAR, LAR and MICR readings. In some embodiments, a confidence score is generated for the MICR and another confidence score is generated for the CAR. In other embodiments, a confidence score is generated for the MICR and another confidence score is generated for the LAR. In other embodiments, confidence scores are generated for all three. In some embodiments, additional scoring logic (operating based on different algorithms) may be used to generate additional confidence scores for one or more of the CAR, LAR, and MICR.

At 312, a confidence score(s) is compared to a target confidence. For example, in one embodiment, the confidence score for the CAR is compared to a threshold value. If the confidence score is too low, that corresponds to a higher probability of the value assigned to the CAR not being correct. Accordingly, if the confidence score is below the target confidence, the customer is prompted to key in a deposit amount at 314. A deposit value is then received from the customer, e.g., via a keypad on the ATM. At process 318, the event indicator is set to a first value (e.g., "A—ATM Prompted).

If, conversely, at 312, the confidence scores are above the target confidence, the scanned-in deposit amount for the deposit is displayed to the customer on the ATM 120 at 316. At 318, the scanned in deposit amount (e.g., the CAR value, the LAR value, or both) is displayed to the customer. The customer is then prompted whether the customer would like to enter a different deposit amount for the check (e.g., "$137.50—Is this correct?"). At 320, if the customer selects to key-in a new deposit amount, then the new amount is received from the customer (e.g., via keypad) and, at 322, the event indicator is set to a second value (e.g., "C—Customer Initiated").

If, conversely, at 320, the customer selects not to key-in a new amount, then that indicates that the customer agrees that the CAR (and/or LAR) value assigned at 304, 306 is (are) correct. At 324, the event indicator is set to a third value (e.g., "N—No Change"). At 326, the event indicator value is transmitted to the event indicator logic 214.

Figure 4:
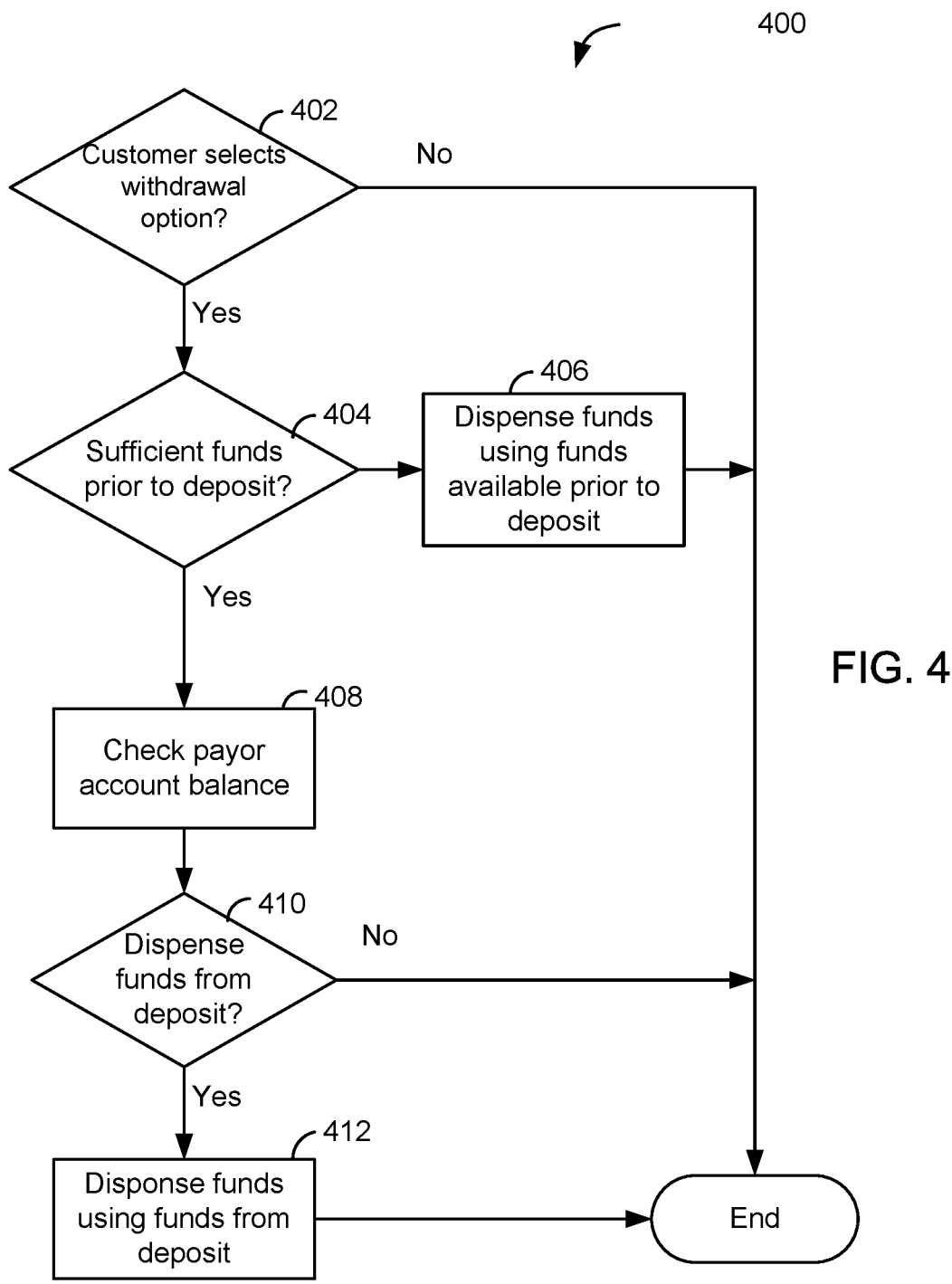
FIG. 4 is a flow diagram of a method of dispensing funds during a withdrawal transaction, such as that implemented by the depositing system shown in FIG. 1, according to an example embodiment.

Referring now to FIG. 4, in some situations, for example, after a user has made a deposit at an ATM, the customer may be prompted to indicate whether the customer wishes to conduct another transaction. Upon receiving an indication that the customer wishes to perform another transaction, the customer may be returned to a main menu of the ATM. The main menu may include a variety of transaction options, including an option to perform a withdrawal.

At 402, an indication is received from the customer that the customer wishes to perform a withdrawal. At 404, if the customer wishes to perform a withdrawal, then the amount of the desired is received from the customer (e.g., via a keypad on the ATM). It is then determined whether the customer had sufficient funds prior to the deposit to cover the withdrawal. For example, if the customer had an account balance of $1,000 prior to the withdrawal, and wishes to withdraw $200, then the withdrawal transaction may be performed by drawing down the existing $1,000 account balance, without regard to whether to the amount/availability of the funds just deposited. If the customer already had sufficient funds, then the funds are dispensed at 406, and the customer may again be prompted to return to a main menu or end the session at the ATM.

If, alternative, at 404, it is determined that the customer did not have sufficient funds prior to the deposit to cover the withdrawal, then potentially the funds from the deposit may be used to cover the withdrawal. To this end, at 408, a check is made to confirm that the payor has sufficient funds in a payor account associated with the deposit. For example, a check may be made to confirm that the payor has enough funds in a checking account against which the deposited check was written. If there are insufficient funds to cover the check, then the withdrawal transaction may not be permitted. As will be appreciated, in some situations, the payor and the customer may both be customers of the same financial institution, in which case the financial institution may make this determination by checking its own account records to determine the account balance of the checking account of the payor. In other situations, the payor and the customer may be customers of different financial institutions. In this case, the financial institution of customer may make initiate a real-time data exchange with the financial institution of the payor to determine the account balance of the checking account of the payor. Depending on the type of deposit instrument (e.g., if payment of the deposit instrument is guaranteed by the bank issuing the deposit instrument), then 408 may be skipped in some situations.

Assuming that sufficient funds are available in the payor account to cover the deposit of the customer, or assuming that the deposit is guaranteed via another mechanism, then at 408 a determination is made as to whether make funds from the deposit immediately available to the user for withdrawal. Various examples of operation 408 are discussed in greater detail below in connection with FIGS. 5A-5B. At 410, if it is determined that the funds from the deposit are to be made available, then the funds requested by the customer are dispensed from the ATM using the funds from the deposit. Otherwise, the customer may be provided with an "insufficient funds," notice, and be returned to the main menu.

Figure 5A:
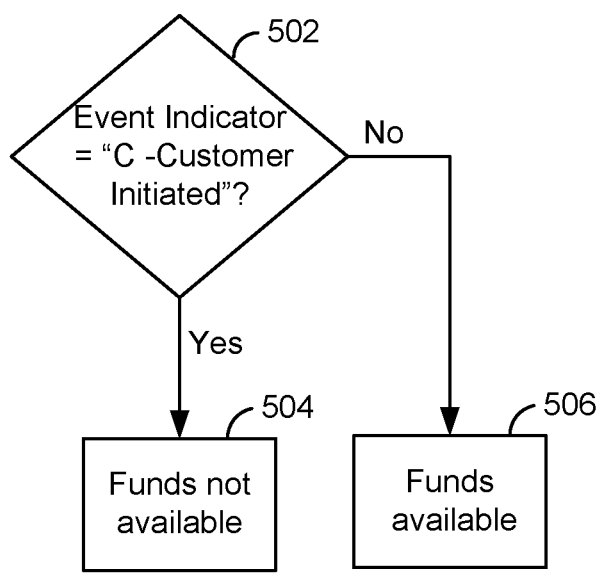
FIGS. 5A and 5B are a flow diagrams of methods of determining whether deposited funds should be made immediately available for withdrawal, such as that implemented by the depositing system shown in FIG. 1, according to an example embodiment.
Figure 5B:
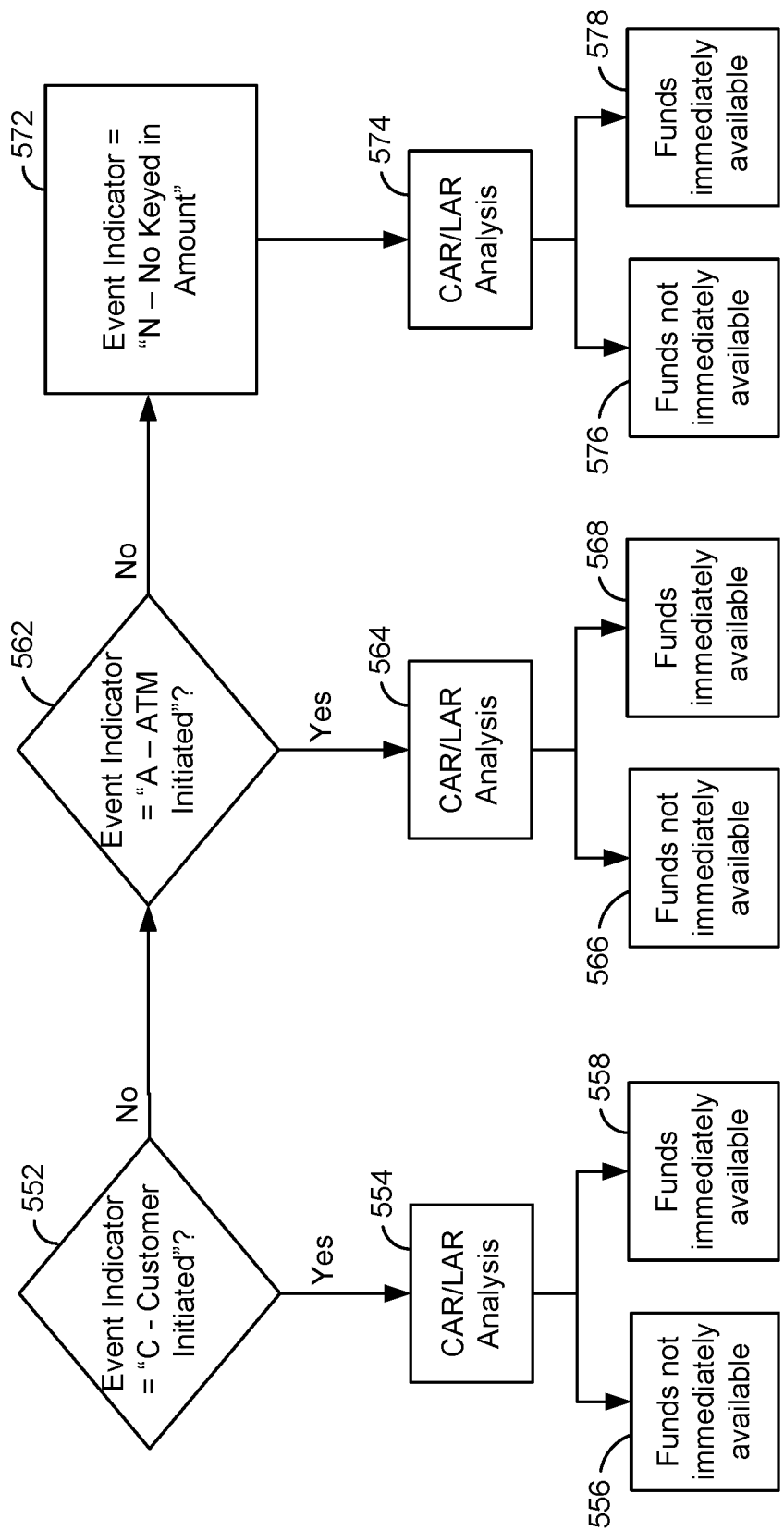

Referring now to FIGS. 5A-5B, various embodiments of operation 408 in FIG. 4 are shown. Referring first to FIG. 5A, in some embodiments, the determination whether to make the funds from the deposit immediately available is made based on whether the customer initiated a change to the deposit value. Hence, as shown in FIG. 5A, if at 502 the customer initiated a change to the deposit value, then that suggests that the initial scan of the deposit value was incorrect. However, it may be considered undesirable to dispense funds based only on an amount keyed-in by the customer. Hence, at 504, it is determined to not make the funds immediately available for withdrawal. Otherwise, if the customer did not initiate a change, the funds are made immediately available at 506.

Referring next to FIG. 5B, in other embodiments, whether the customer initiated a change in the deposit amount is only one of multiple parameters used to determine whether to make the funds immediately available for withdrawal. That is, the determination whether to make the funds immediately available may be made based on one or more other parameters as well. For example, as shown in FIG. 5B, the determination may also take into other parameters, such as one or more of the CAR value, the confidence score for the CAR value, the LAR value, the confidence value for the LAR value and so on.

Thus, as shown in FIG. 5B, in some situations, the customer may have initiated a change in the deposit amount (Event indicator="C—Customer Initiated Change") at 552. In this situation, rather than automatically determining that the funds will not be made immediately available for a withdrawal, further analysis may be performed. As one example, the withdrawal may be allowed (at 558) if the CAR confidence score is below a threshold value (e.g., if the confidence in the CAR value extracted from the check image is relatively low, but not sufficiently low to have prompted the user to enter the deposit amount (i.e., as in the case of a Event indicator="A—ATM initiated change). As another example, the withdrawal may be disallowed (at 556) if the CAR confidence score is above a threshold value (e.g., if the confidence in the CAR value extracted from the check image is particularly high, such that the user's entry is deemed suspicious).

As another example, the funds availability logic 224 compares the keyed-in deposit amount to at least one of the CAR deposit amount and the LAR deposit amount and processes the deposit differently based on this comparison. For example, if the keyed-in deposit amount is lower than either the CAR or LAR deposit amounts, the funds availability logic 224 may increase the availability value and/or decrease the availability threshold. For example, if the CAR value indicates a deposit amount of $156.00, and the customer changes the deposit value to $155.00, then a downward adjustment in the deposit value may be deemed to be unlikely to be indicative of attempted fraud. In another example, if the keyed-in deposit amount is greater than the CAR or LAR deposit amounts, the funds availability logic 224 may decrease the availability value and/or increase the availability threshold. For example, if the CAR value indicates a deposit amount of $10.00, and the customer changes the deposit value to $100.00, then the upward adjustment in the deposit value may be considered relatively more suspicious.

As another example, the withdrawal may be disallowed based on a comparison of the deposit value entered by the customer, the CAR value, and the LAR value. In some embodiments, the deposit information logic 222 compares a CAR deposit amount and a LAR deposit amount to determine a difference. It is often easier for a fraudster to alter the numerical deposit amount rather than the written deposit amount. For example, a check with a CAR value of $10.00 may be altered by the insertion of another zero, resulting in a check with a CAR value of $100.00. However, it is more difficult to alter "Ten dollars and no cents" to resemble "One-hundred dollars and no cents." Accordingly, reading both CAR and LAR and comparing them against each other may be more effective at preventing fraud than reading CAR alone. If the difference between the CAR deposit amount and the LAR deposit amount is above a threshold amount, a threshold percentage, or other threshold value, the corresponding deposit information is flagged before it is output to the funds availability logic 224. The threshold amount may reflect a value that is an undesirable difference between the CAR deposit amount and the LAR deposit amount. The deposit amount threshold may indicate that the deposit information may not be obtained accurately by the ATM 120. The difference between the CAR and LAR deposit amounts may be indicative of an altered deposit. A comparison against the value keyed-in by the customer may also be made. For example, in this example, if the (potentially altered) CAR value extracted from the check is $100.00, but the LAR value is only ten dollars, and the customer changed the deposit amount from $10.00 to $100.00, then that may be a parameter considered in determining to disallow the withdrawal. Accordingly, immediate availability of the funds for withdrawal may be denied, and an alert for further analysis of the check image (e.g., manual analysis) may be generated.

As another example, the funds availability logic 224 may compute a confidence score for the keyed-in deposit amount entered by the customer. This confidence score may be based on an analysis of the check image, and may reflect the probability that the OCR image contains the amount keyed in by the customer. For example, a fraudster may have altered a check by changing the CAR from "$10.00" to "1000.00," but leaving the LAR unchanged. The funds availability logic 224 may compute a confidence score reflecting the probability that the LAR contains the alpha-numeric value "One thousand dollars and no cents." Given that "Ten dollars and no cents" (the amount actually written on the check) and "One thousand dollars and no cents" bear very little resemblance to each other, the confidence score for the deposit amount entered by the customer would be very low. On this basis, it may be determined that the funds will not be made immediately available for a withdrawal.

In general, a confidence in the keyed-in deposit below a target confidence threshold may generate an alert. The alert may indicate that additional analysis of the deposit by the financial institution computing system 140 should be performed (e.g., additional backend processing/review after the ATM session is completed). The additional analysis may be re-performing CAR and/or LAR analysis. The alert may additionally or alternatively indicate that the bank associated with the customer should perform additional (e.g., manual) analysis of the deposit to assess the possibility of fraud. Depending on the magnitude of the difference between the confidence and the target confidence threshold, more of less analysis may be required.

In other situations, in FIG. 5B, the ATM may have prompted the customer to enter a deposit amount (Event indicator="A—ATM Initiated") at 562. Operations 562-568 may be performed in generally the same manner as operations 552-558, respectively, except that greater credence may be afforded to the deposit amount entered by the customer, given that the customer was required to enter the deposit amount (rather than initiating the change in a "Event indicator=C—Customer Initiated Change" type situation).

In other situations, in FIG. 5B, no keyed in amount may have been received (Event indicator="N—No Keyed-in Amount") at 572. Operations 572-578 may be performed in generally the same manner as operations 552-558, respectively, except that to the extent that there is no deposit amount entered by the customer. For example, at 574, the CAR value may be compared to the LAR value. Hence, if the customer changed an initial CAR value of "$10.00" to "$1000.00," the CAR/LAR comparison may reflect that the CAR and LAR values are inconsistent. On this basis, a determination may be made not to make the funds immediately available for withdrawal, even though there was no customer initiated change in the deposit amount.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

It is understood that where embodiments, examples, or components, specifically the financial institution computing system 140 and the risk-decisioning system 150, have been described herein as querying other components or systems, that the arrangement can also be reversed such that, rather than querying other components, these components are configured to await transmissions from the other components.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific deposit and composition of method steps, it is understood that the deposit of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The deposit or sequence of any element or apparatus may be varied or substituted according to alternative embodiments. Accordingly, all such modifications are intended to be included within the scope of the present disclosure as defined in the appended claims. Such variations may depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A financial institution computing system for use in processing a deposit from a customer at an automated teller machine (ATM), comprising:
    input/output logic configured to receive, from the ATM, deposit information and an event indicator value corresponding to an interaction between the customer and the ATM;
    confidence score generating logic configured to analyze the deposit information received from the ATM and to determine a confidence score related to an amount of the deposit based on the analysis; and
    a risk-decisioning system including funds availability logic configured to calculate an availability value based on the event indicator and the confidence score,
    wherein the risk-decisioning system is configured determine that the availability value is greater than an availability threshold, and to responsively make an amount of funds available to the customer for withdrawal at the ATM.

2. The system of claim 1, wherein the confidence score generating logic is configured to determine a plurality of confidence scores, and the funds availability logic is configured to determine the availability value based on a plurality of confidence scores.

3. The system of claim 2, wherein the plurality of confidence scores includes at least two of: a magnetic ink character recognition (MICR) confidence score, a courtesy amount recognition (CAR) confidence score, and a legal amount recognition (LAR) confidence score.

4. The system of claim 1, wherein the input/output logic is configured to receive, from the ATM, values extracted from a scanned-in image, and the confidence score generating logic is configured to the confidence score based on the extracted values.

5. The system of claim 1, wherein the input/output logic is configured to receive the confidence score as part of the deposit information.

6. The system of claim 1, wherein the availability threshold is based on the amount of the deposit.

7. An automated teller machine (ATM), comprising:
event indicator logic configured to determine an event indicator value indicating whether a customer was prompted to enter a keyed-in deposit amount, or indicating that the customer did not enter a keyed-in deposit amount;
deposit logic configured to determine deposit information related to a transaction;
input/output logic configured to transmit, to a financial institution computing system, the event indicator value and the deposit information, and to receive, from the financial institution computing system, an indication that an amount of funds is available for withdrawal, the amount determined by the financial institution computing system based on the event indicator value; and
a receptacle configured to dispense funds.

8. The ATM of claim 7, wherein the event indicator logic determines a first value as the event indicator value when the customer enters a keyed-in deposit amount into the ATM without prompting, a second value as the event indicator value when the customer is prompted to enter a keyed-in deposit amount into the ATM by the ATM, and a third value as the event indicator value when the customer does not enter a keyed-in deposit amount into the ATM, and wherein the first value, the second value, and the third value are all distinct from one another.

9. The ATM of claim 7, wherein the one or more confidence scores includes at least two confidence score respectively related to two of: a magnetic ink character recognition (MICR) confidence score, a courtesy amount recognition (CAR) confidence score, and a legal amount recognition (LAR) confidence score.

10. The ATM of claim 7, wherein the ATM is configured to receive a scanned image, and to extracted values from the scanned image to determine at least one of magnetic ink character recognition (MICR) information, courtesy amount recognition (CAR) information, and legal amount recognition (LAR) information.

11. The ATM of claim 10, wherein the input/output logic is configured to transmit, to the financial institution computing system, the at least one of the magnetic ink character recognition (MICR) information, the courtesy amount recognition (CAR) information, and the legal amount recognition (LAR) information.

12. The ATM of claim 10, wherein the ATM further comprises confidence score generating logic configured to determine one or more confidence scores based on the extracted values, and the input/output logic is configured to transmit, to the financial institution computing system, the one or more confidence scores.

13. The ATM of claim 7, wherein the ATM is configured to receive a scanned image, and to transmit the scanned image to the financial institution computing system.

14. A method for processing a deposit of a customer of an automated teller machine (ATM) using a financial institution computing system, comprising:
receiving deposit information from the ATM;
analyzing the deposit information to determine a confidence score;
receiving, from the ATM, an event indicator having an event indicator value corresponding to an interaction between the customer and the ATM;
calculating an availability value based on the event indicator and the ATM information; and
making an amount of funds available to the customer for immediate withdrawal at the ATM responsive to the availability value being greater than an availability threshold.

15. The method of claim 14, wherein the deposit information comprises a first confidence score, and a second confidence score different from the first confidence score.

16. The method of claim 15, wherein the first confidence score is indicative of a magnetic ink character recognition reading of the deposit and the second confidence score is indicative of a numerical amount reading from the deposit.

17. The method of claim 14, further comprising receiving customer information from the ATM and retrieving information from a customer information database using the customer information.

18. The method of claim 17, further comprising instructing the ATM to dispense funds responsive to the availability value being greater than the availability threshold, wherein the deposit is one of a check deposit and a money order.

19. The method of claim 14, further comprising selectively controlling a receptacle of the ATM to receive the deposit from the customer and to dispense the amount of funds from the deposit that are available to the customer for immediate withdrawal.

20. The method of claim 14, wherein the deposit information further comprises an originally scanned deposit amount from the deposit.

* * * * *